Sept. 28, 1965     A. G. BIGNALL ETAL     3,208,600

WORK TRANSFER APPARATUS

Filed Jan. 30, 1962     7 Sheets-Sheet 1

Arthur G. Bignall,
Leonard P. Kumpf,
Inventors.
Koenig, Pope, Senniger and Powers,
Attorneys.

Sept. 28, 1965   A. G. BIGNALL ETAL   3,208,600
WORK TRANSFER APPARATUS
Filed Jan. 30, 1962   7 Sheets-Sheet 4

FIG. 8.

United States Patent Office 3,208,600
Patented Sept. 28, 1965

1

3,208,600
WORK TRANSFER APPARATUS
Arthur G. Bignall, Kirkwood, and Leonard P. Kumpf, Affton, Mo., assignors to Lasalco Incorporated, St. Louis, Mo., a corporation of Missouri
Filed Jan. 30, 1962, Ser. No. 169,893
10 Claims. (Cl. 214—1)

This invention relates to work transfer apparatus, and more particularly to such apparatus for transferring work-supporting racks between an auxiliary conveyor and plating apparatus or the like.

It will be understood that a typical plating apparatus comprises a series of tanks containing various processing baths into which work to be plated is dipped and a series of movable carriers for carrying racks holding the work from one tank to the next and for dipping the racks into the tanks. This invention is particularly concerned with a transfer apparatus for transferring racks from an auxiliary conveyor to the carriers of the plating apparatus, and also for transferring racks from the carriers of the plating apparatus (after completion of the plating operation) back to the auxiliary conveyor for carrying off the completed work. A typical work-carrying rack comprises a frame for holding a plurality of workpieces, the frame having a horizontal bar at the top. The auxiliary conveyor typically comprises a chain having pairs of hooks at spaced intervals along its lengths, each pair of hooks being adapted for cradling of the top bar of a rack. Each of the rack carriers of the plating apparatus typically comprises a corresponding pair of hooks adapted for cradling the top bar of a rack. In each instance, the racks hang down from the hooks.

Among the several objects of this invention may be noted the provision of apparatus for transferring racks such as described from the rack-carrying hooks of the auxiliary conveyor to the rack-carrying hooks of the plating apparatus, and vice versa, which functions vertically to lift a rack off a pair of hooks of the conveyor unit or plating unit, as the case may be, horizontally transport the rack in raised position to a position above a pair of hooks of the other unit, and then vertically lower the rack to cradle its top bar in the hooks of the other unit, for most efficient transfer of the racks without the possibility of jamming or of skipping a rack; and the provision of such apparatus which comprises a carriage movable continuously from a first end position to a second end position, and movable continuously back to the first end position, lift means associated with the carriage, and means whereby, on movement of the carriage in either direction, the lowered lifters are first moved horizontally, then raised vertically without horizontal movement, then moved horizontally, then lowered vertically without horizontal movement, and then moved horizontally to the respective end position. Other objects and features will be in part apparent and in part pointed out hereinafter.

The invention accordingly comprises the constructions hereinafter described, the scope of the invention being indicated in the following claims.

In the accompanying drawings, in which one of various possible embodiments of the invention is illustrated.

2

Corresponding reference characters indicate corresponding parts throughout the several views of the drawings.

Figure 8:
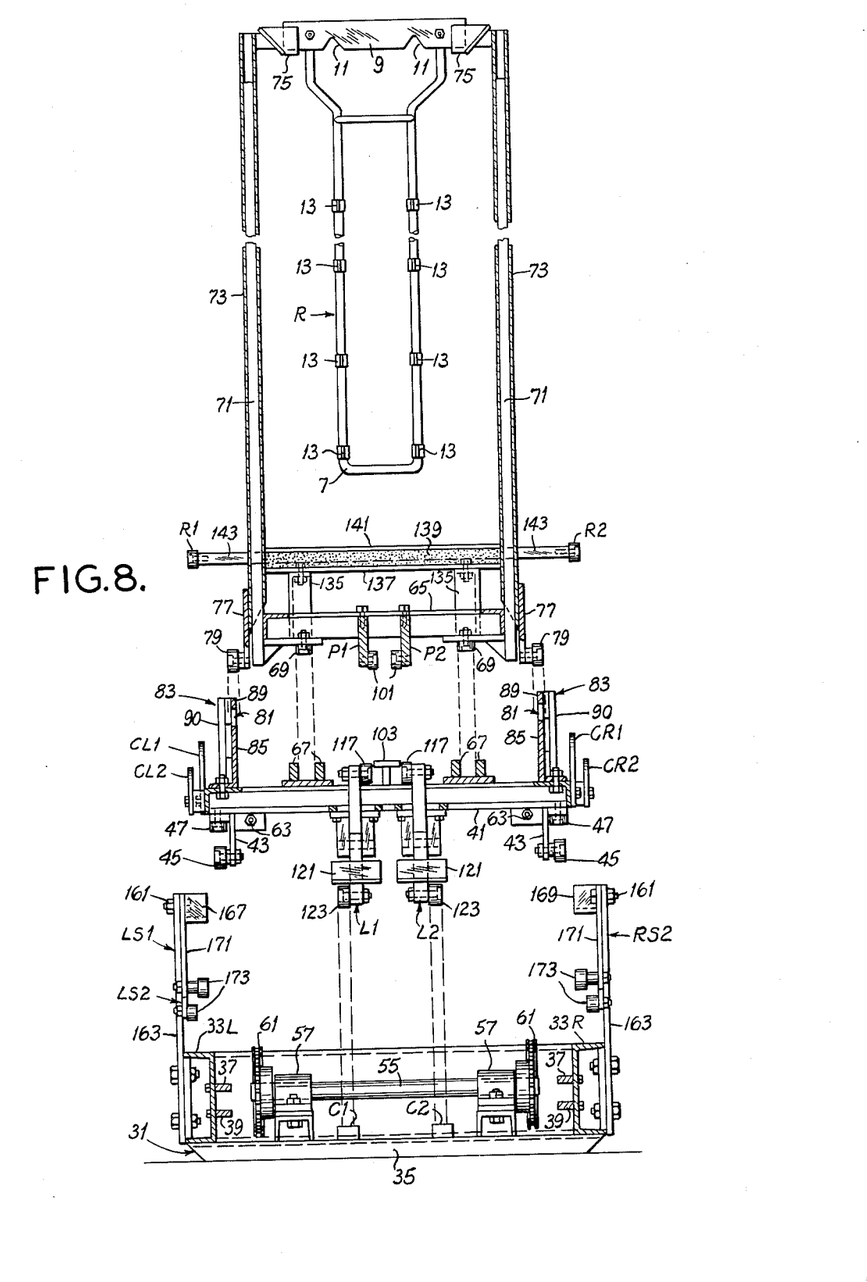
FIG. 8 is an exploded view showing certain parts of the transfer apparatus with certain parts broken away and shown in section.

Referring first to FIGS. 1–4 of the drawings, there is represented at 1 a rack carrier of a typical plating machine, and there is represented at 3 a rack carrier of a typical auxiliary conveyor for conveying racks R (see FIGS. 8–14) holding workpieces to be plated to a transfer station for transfer from the auxiliary conveyor to the plating apparatus, and for receiving racks holding plated work from the plating apparatus and for conveying the racks away, as through an oven. It will be undestood that rack carrier 1 is one of an endless series of similar rack carriers of the plating apparatus, and rack carrier 3 is one of a series of similar rack carriers on an endless chain 5. As appears in FIG. 8, rack R may comprise, for example, a frame 7 made of metal bar stock and having a horizontal top bar 9, the ends of which project at opposite sides of the frame. Top bar 9 may have a pair of notches 11 in its lower edge, and frame 7 has a plurality of pegs such as represented at 13 on which workpieces may be hung. Each rack carrier 1 of the plating machine comprises, for example, a casting 15 such as shown in detail in FIG. 3 formed to provide a pair of hooks 17 adapted to receive the top bar of a rack. This casting is mounted on an arm 19 adapted to travel over the series of tanks of the plating apparatus (not shown) and adapted to move up and down to lift and lower the rack hanging from the hooks. Each rack carrier 3 of the auxiliary conveyor comprises, for example, a hanger 21 having a pair of hooks 23 adapted to receive the top bar of a rack. The auxiliary conveyor is adapted to convey racks R hung on conveyor hooks 23 to a transfer station opposite a rack carrier 1 of the plating apparatus at a corresponding transfer station and the transfer apparatus of this invention is adapted vertically to lift a rack (which may be referred to as the entering rack) from the pair of hooks 23 of the auxiliary conveyor at the transfer station, transport this entering rack horizontally to a position wherein the top bar 9 of the rack is over the pair of hooks 17 of a rack carrier 1 of the plating apparatus at the transfer station, and then lower the rack to cradle the top bar of the rack in the hooks 17 of the rack carrier of the plating apparatus. Then, after operation of the plating apparatus to carry the entering rack into the plating apparatus and bring another rack carrier 1 carrying a rack with completed work thereon (which may be referred to as the exiting rack) to its transfer station, the transfer apparatus operates in reverse to transfer the exiting rack from the carrier 1 which has just moved to the transfer station to the recently vacated pair of hooks 23 of the auxiliary carirer. Then, the auxiliary conveyor is advanced forward to bring another pair of hooks 23 carrying the next entering rack to the transfer station, and the transfer apparatus functions to transfer this entering rack to the recently vacated pair of hooks 17 of the plating apparatus, and so on. Hangers 21 are carried by forks 25 having rollers 27 riding on the bottom flange of an I-beam 29, the forks being secured to the chain 5.

Transfer apparatus for transferring racks R from the auxiliary conveyor to the plating apparatus and vice versa is shown to comprise an elongate base designated in its entirety by reference character 31. For purposes of simplifying the description, reference will be made to the side of the base which appears in FIGS. 1 and 9–14 (and toward the bottom of the sheet in FIG. 4) as the left side, and to the other side of the base as its right side. The right end of the base as it appears in FIGS. 1, 4 and 9–14 will be referred to as its drive end or starting end, and the left end of the base as it appears in these figures of the drawings will be referred to as its forward end. Base 31 comprises a left side rail 33L and a right side rail 33R supported on tranverse base bars 35 which rest on the floor. As shown, each side rail comprises a structural channel member arranged with its web extending vertically and on the inside, and having upper and lower horizontal track members 37 and 39 secured on the inside of its web. A main carriage 41 is mounted for longitudinal movement on the base, having side plates 43 carrying rollers 45 riding between the track members 37 and 39, and rollers 47 engaging the insides of rails 33L and 33R adjacent the top of the latter for holding the carriage against transverse movement.

Means is provided for moving the main carriage 41 longitudinally on the base. As shown, this means comprises a drive shaft 49 journalled in bearings 51 at the drive end of the base, extending horizontally across the base, and carrying a pair of sprockets 53. An idler shaft 55 is journalled in bearings 57 at the other end (the forward end) of the base extending transversely of the base and carries a pair of sprockets 59 aligned with sprockets 53. Chains 61 are trained around the sprockets, each chain having its ends attached to the main carriage 41 as indicated at 62 and 63, the arrangement being such that on rotation of drive shaft 49 in one direction the main carriage 41 is pulled toward one end of the base and on rotation of the drive shaft in the opposite direction the main carriage 41 is pulled toward the other end of the base.

An auxiliary carriage 65 is carried by the main carriage 41 for movement therewith and longitudinal shifting movement relative thereto. For this purpose, the main carriage has pairs of longitudinally extending rails 67 thereon. The auxiliary carriage is longitudinally slidable on these rails, and has rollers 69 which ride between the two rails of each pair to guide it. Extending upward from the auxiliary carriage 65 adjacent opposite sides thereof are two vertical guide posts designated 71. These are fixed at their lower ends to the auxiliary carriage. Vertically slidable on each post is an elongate sleeve or tube 73 which constitutes a lifter. Each lifter 73 has a V-shaped cradle 75 extending inwardly at its upper end. These cradles are adapted to receive the ends of the top bar 9 of a rack R.

Figures 1, 2, 3:
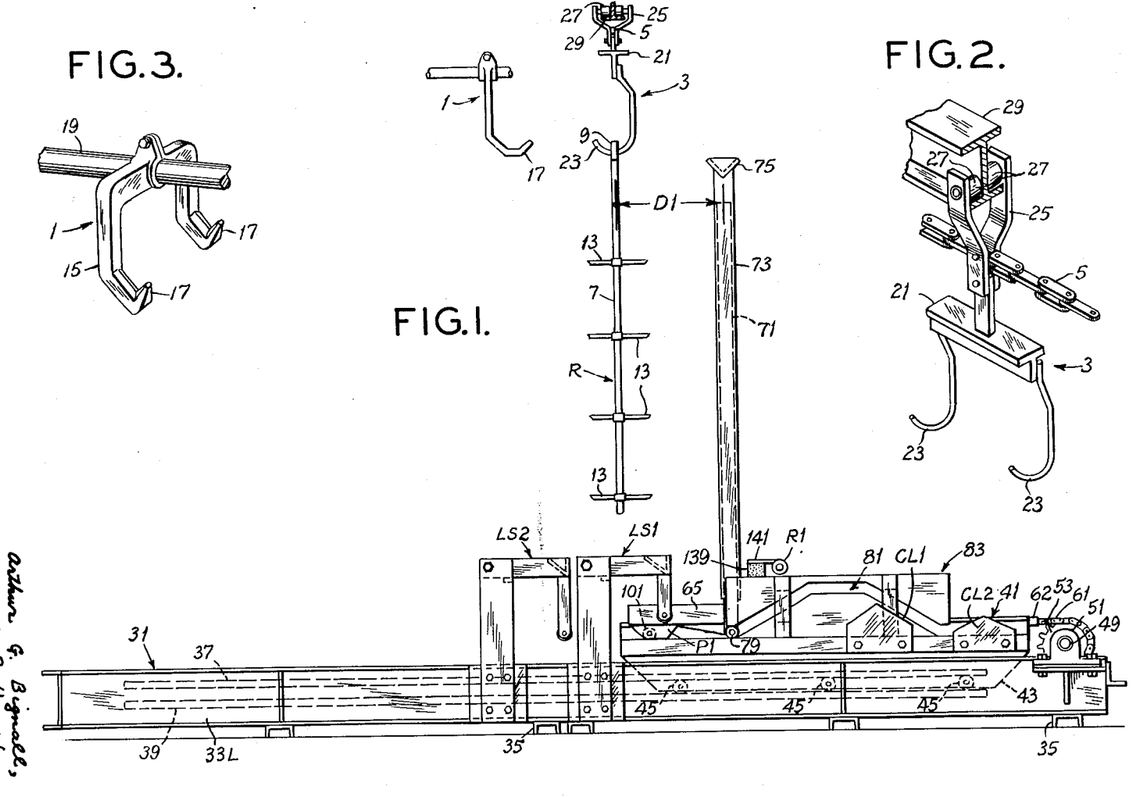
FIG. 1 is a side elevation of a transfer apparatus constructed in accordance with this invention, showing its relation to an auxiliary conveyor and a plating apparatus, and showing parts in a starting position.
FIG. 2 is perspective showing a pair of hooks on the auxiliary conveyor.
FIG. 3 is a perspective showing a pair of hooks of the plating apparatus.
Figure 5:
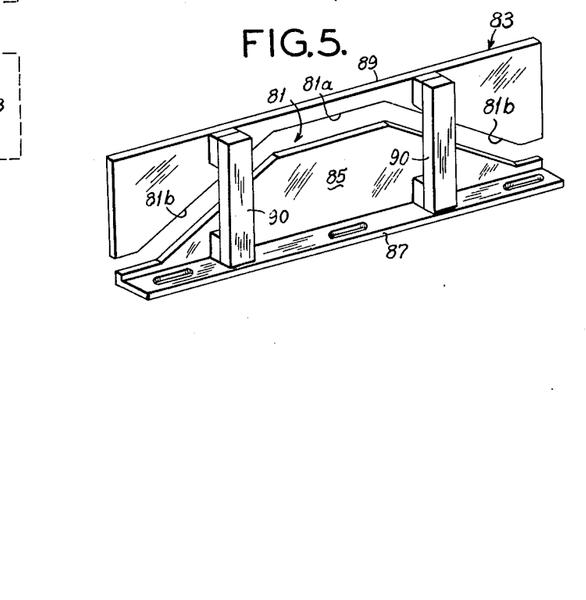
FIG. 5 is a detail of a cam assembly.
Figure 9:
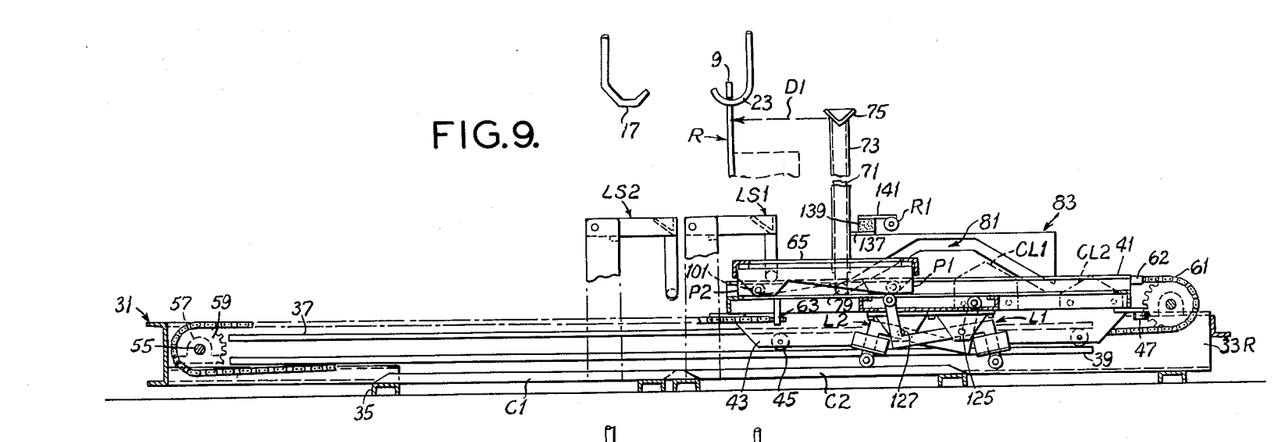
FIG. 9 is a view similar to FIG. 1 with parts broken away and shown in section.

Each lifter 73 has an extension 77 at its lower end on the outside of the respective guide post 71 carrying a cam follower roller 79 which is received in a cam slot or track 81 is a cam assembly 83 on the respective side of the main carriage 41. Each cam assembly (see FIG. 5) comprises a lower vertical plate 85 having a horizontal bottom flange 87 by means of which it is fixed on top of the main carriage and an upper vertical plate 89 supported by straps 90 in position above and coplanar with the lower plate 85. The upper edge of plate 85 and the lower edge of plate 89 are spaced apart to define the cam slot or track 81, which has a central horizontal elevated portion 81a and ramp portions 81b inclined upward toward the ends of elevated portion 81a. The auxiliary carriage 65 with the lifters 73 thereon (which may be referred to as lift means) is longitudinally shiftable relative to the main carriage 41 between end positions in one of which the cam follower rollers 79 are at the outer (lower) end of one of the ramps 81b of each track 81 and in the other of which the rollers 79 are at the outer (lower) end of the other ramp 81b of each track 81. As shown in FIGS. 1 and 9, the auxiliary carriage is in a left-hand or forward position relative to the main carriage 41, and rollers 79 are at the left or forward ends of the left-hand or forward ramps 81b. Upon longitudinal shift of the main carriage 41 and cam assemblies 83 thereon to the left relative to the auxiliary carriage, rollers 79 ride up the left-hand ramps to elevated cam track portions 81a and the lifters 73 are raised (see FIG. 11). On further longitudinal shift of the main carriage and cam assemblies to the left relative to the auxiliary carriage, rollers 79 ride down the right-hand ramps to their outer (right) ends, and lifters 73 are lowered (see FIG. 13).

Figure 4:
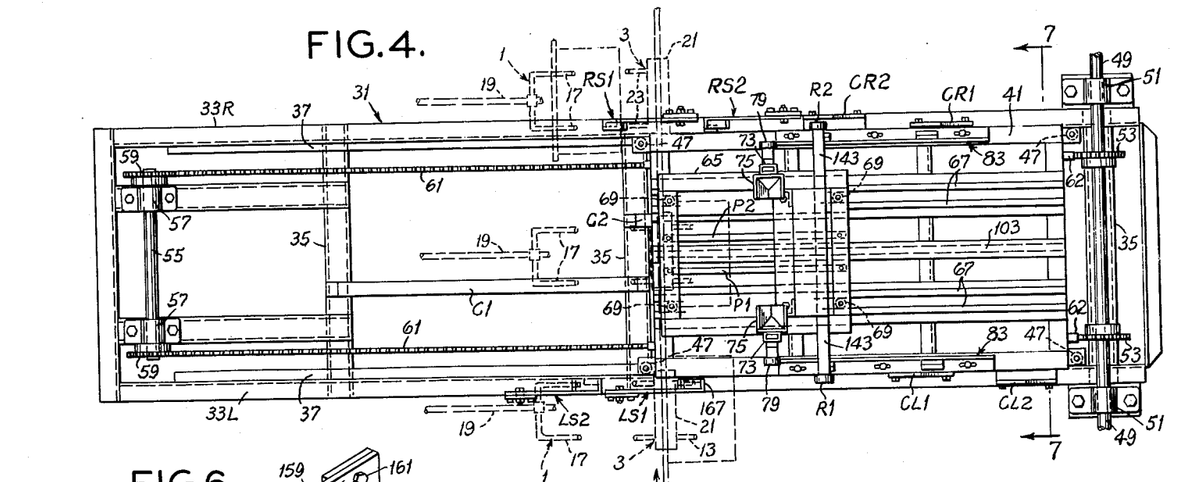
FIG. 4 is a plan view of the transfer apparatus, showing parts in the FIG. 1 position.

As appears in FIGS. 1 and 4, the transfer apparatus is positioned on the floor extending transverse to the direction of travel of rack carriers 1 and 3, the base 31 of the transfer apparatus extending under the auxiliary conveyor chain 5 and the rack carriers 1 of the plating apparatus, with the drive end of the base outward of the auxiliary conveyor chain (to the right of the auxiliary conveyor chain as viewed in FIGS. 1 and 4). At the start of a typical cycle of operation of the transfer apparatus, the main carriage 41 initially occupies a starting position as shown in FIGS. 1 and 9 adjacent the drive end of the base. The end of the main carriage 41 toward the drive end of the base (its right end as viewed in FIGS. 1 and 9) may then be referred to as the rearward end of the main carriage and the other end of the main carriage (its left end) may then be referred to as its forward end. The auxiliary carriage 65 initially occupies the forward position as shown in FIGS. 1 and 9 toward the forward (left) end of the main carriage, cam follower rollers 79 are at the outer ends of the left-hand or forward ramps 81b of cam tracks 81, and lifters 73 are lowered. As appears in FIGS. 1 and 9, lifters 73 are spaced rearward of the hooks 23 of the auxiliary conveyor and, the lifters being lowered, the cradles 75 at their upper ends are below the level of the bottom of the hooks 23 (and below the level of the top bar 9 of a rack R carried by hooks 23). A pair of hooks 17 of the plating apparatus is located forward (to the left as viewed in FIGS. 1 and 9) of the hooks 23 of the auxiliary conveyor and at approximately the same level as the latter hooks.

To cycle the transfer apparatus, the drive shaft 49 is rotated in the direction to drive the main carriage 41 forward (toward the left as viewed in FIGS 1 and 9). During the initial phase of forward movement of the main carriage through a predetermined clearance distance, the auxiliary carriage 65 moves forward with the main carriage. This conjoint movement of the two carriages continues to the point where the lifters 73 (which are lowered) come directly under the top bar 9 of the rack R hanging down from hooks 23 of the auxiliary conveyor (see FIG. 10). At this point, forward movement of the auxiliary carriage 65 is arrested. The main carriage continues to move forward while the auxiliary carriage is held stationary for a lift interval. Cam assemblies 83 move forward with the main carriage 41 and their forward ramps 81b effect vertical lift of the lifters 73. The cradles 75 at the upper end of the lifters vertically raise top bar 9 of the rack R off hooks 23 (see FIG. 11). The auxiliary carriage 65 remains stationary until the main carriage 41 has moved forward to the point where cam follower rollers 79 are generally centered in the horizontal elevated portions 81a of cam tracks 81. Then the auxiliary carriage 65 is released for continued forward movement with the main carriage 41 and locked to the main carriage. The latter continues its forward movement and the auxiliary carriage moves forward along with it to the point where the top bar 9 of the rack R supported by the raised lifters 73 is brought over to the hooks 17 of the plating apparatus (see FIG. 12). At this point, forward movement of the auxiliary carriage 65 is again arrested.

The main carriage 41 is unlocked from the auxiliary carriage and continues to move forward while the auxiliary carriage remains stationary. Cam follower rollers 79 thereupon ride down the right-hand ramps 81b of cam tracks 81 and the lifters 73 are vertically lowered to lower the top bar 9 of the rack R into the hooks 17 (see FIG. 13). Then, the auxiliary carriage 65 is released for further forward movement with the main carriage 41. The latter continues its forward movement and the auxiliary carriage moves forward along with it (the lifters 73 being in lowered position) for a predetermined clearance distance, and then forward movement of the main carriage and the auxiliary carriage ceases (see FIG. 14). Then, the main carriage and the auxiliary carriage are brought back to the starting position by reversing the direction of rotation of the drive shaft 49, and on such return movement all the above described actions occur in reverse, as will be made clear.

Extending down from the auxiliary carriage 65 on opposite sides of its longitudinal center line are left and right vertical lock plates P1 and P2. Plate P1 is shown per se in FIG. 15, and plate P2 is identical thereto, each of these plates having a locking notch 95 at the bottom. This notch has a gradual rise 97 and a relatively steep leading end 99. Plates P1 and P2 are secured to auxiliary carriage 65 in reverse relation so that the leading end of the notch in plate P1 is toward the left as viewed in FIGS. 9–14, and the leading end of the notch in plate P2 is toward the right as viewed in FIGS. 9–14. Each plate P1 and P2 carries rollers 101 which ride under the top of a T-section track 103 on the main carriage 41.

Figures 13, 14, 15:
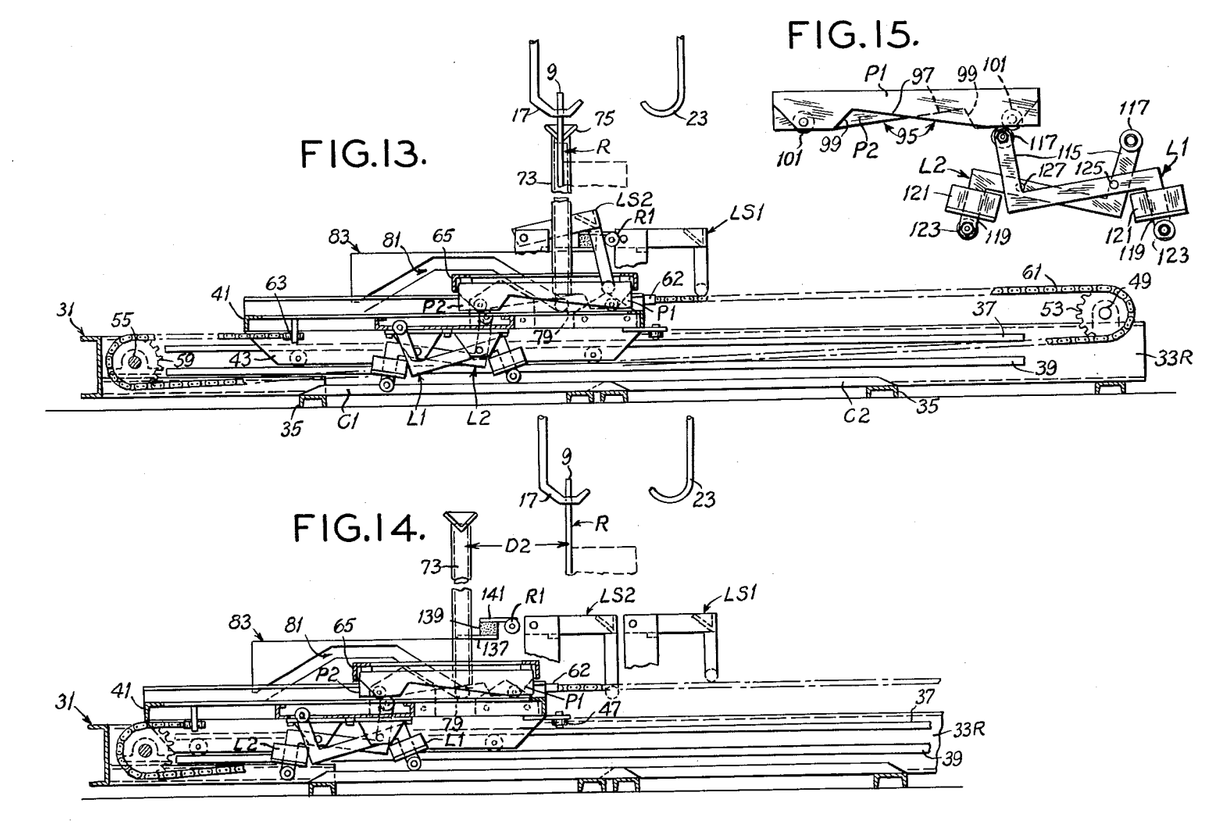
FIG. 15 is a detail of a carriage lock mechanism.

The main carriage 41 carries a latch L1 cooperable with lock plate P1 and a latch L2 cooperable with lock plate P2. Latch L1, in cooperation with lock plate P1, locks the auxiliary and main carriages together on forward movement thereof from the FIG. 11 to the FIG. 12 position. Latch L2, in cooperation with lock plate P2, locks the auxiliary and main carriages on return movement thereof from the FIG. 12 to the FIG. 11 position. Latch L1 is shown in FIG. 15, and latch L2 is identical thereto. Each comprises a lever adapted to be pivotally mounted intermediate its ends and having an upwardly extending arm 115 at one end carrying a roller 117 adapted for engagement in the notch of the respective locking plate, and a downwardly extending arm 119 at its other end carrying a biasing weight 121 and a cam follower roller 123. Latch L1 is pivoted on the main carriage as indicated at 125 in position for cooperation with the left-hand lock plate P1. Latch L2 is pivoted on the main carriage as indicated at 127, in reverse relation with respect to latch L1, and in position for cooperation with the right-hand lock plate P2. A cam rail C1 is secured to the base for controlling latch L1, and a cam rail C2 is secured to the base for controlling latch L2.

The auxiliary carriage 65 carries a pair of supports 135 for a transverse plate 137 located toward the rear end of the auxiliary carriage (its right end as viewed in FIG. 1, 4 and 9–14). Secured on this transverse plate is an elongate rubber bumper bar 139, and secured on top of the rubber bumper bar is a top plate 141 which projects out toward the right as viewed in FIG. 1 from the bumper bar. Plate 141 has arms 143 projecting out laterally from its ends. The arm 143 at the left carries a roller R1 and the arm at the right carries a roller R2. Roller R1 is adapted for engagement first with a stop LS1 on forward movement of the carriages toward the left as viewed in FIGS. 1, 4 and 9 to arrest the auxiliary carriage in the FIG. 10 position for a lift interval, and subsequently with a stop LS2 to arrest the auxiliary carriage in the FIG. 12 position for a lowering interval. Roller R2 is adapted for engagement, on return movement of the carriages toward the right from the FIG. 14 end position, first with a stop RS1 to arrest the carriage in the FIG. 13 position for a lift interval, and subsequently with a stop RS2 to arrest the auxiliary carriage in the FIG. 11 position for a lowering interval.

Figure 6:
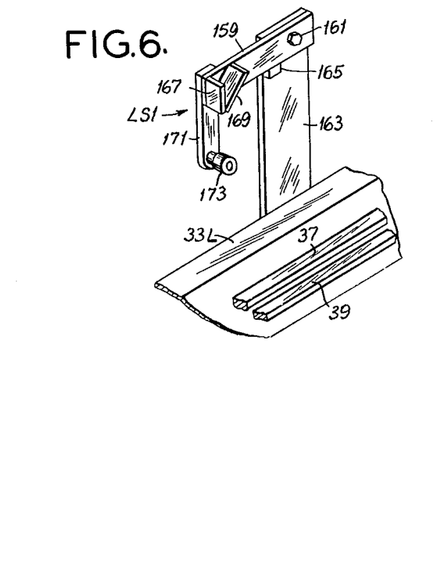
FIG. 6 is a detail of a carriage stop.
Figure 7:
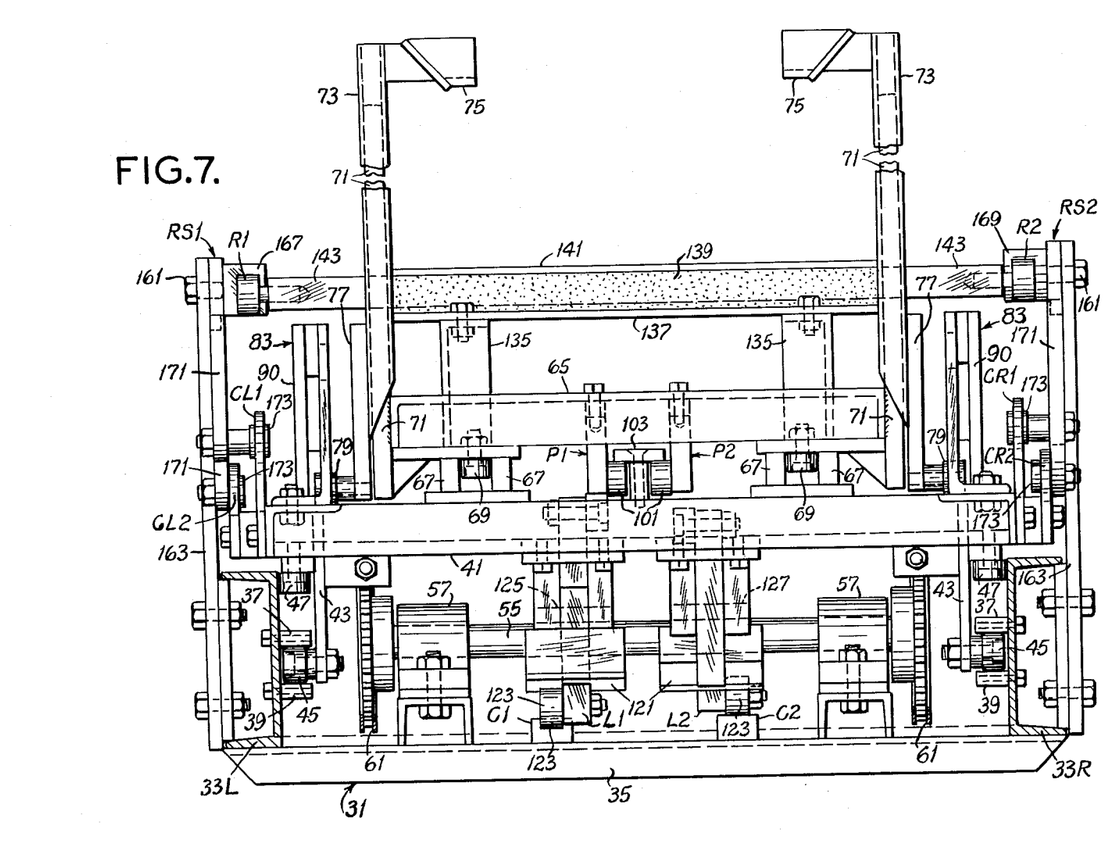
FIG. 7 is an enlarged vertical transverse section taken on line 7—7 of FIG. 4.

Stops LS1, LS2, RS1 and RS2 are substantially identical. As shown in FIG. 6 for stop LS1, each stop comprises an arm 159 pivoted at 161 on a post 163 mounted on the respective side rail 33L or 33R. Downward swing of the arm is limited by a stop 165 on the post. At the free end of the arm is a stop plate 165. Behind this is an inclined plate 169. Extending down from the free end of the arm is a leg 171 carrying a cam follower roller 173. The legs 171 of stops LS2 and RS2 are somewhat longer than the legs 171 of stops LS1 and RS1, otherwise the stops are of identical construction. Stops LS1 and LS2 are located at the left of the base 31, and stops RS1 and RS2 are located at the right of base 31 in reverse relation to stops LS1 and LS2. On the main carriage 41 at the left side thereof are first and second cams CL1 and CL2 engageable, respectively, with cam follower rollers 173 of the left side stops LS1 and LS2. On the main carriage at the right side thereof are first and second cams CR1 and CR2 engageable, respectively, with cam follower rollers 173 of the right side stops RS1 and RS2. Cams CR1 and CR2 are identical to cams CL1 and CL2, but reversely arranged relative thereto.

Operation is as follows:

At the start of a cycle of the transfer apparatus, the auxiliary conveyor will have completed an indexing movement to bring a pair of auxiliary conveyor hooks 23 carrying a rack R holding work to be plated to the rack transfer station where the rack may be picked up by the lifters 73 (the lift means) of the transfer apparatus. At this time, an empty pair of hooks 17 of the plating apparatus is stopped at the work transfer station, being positioned opposite the stated air of hooks 23 of the auxiliary conveyor. The main carriage 41 of the transfer apparatus occupies its retracted starting position at the rearward end of base 31 (the drive end of the base and its right end as viewed in FIGS. 1 and 9), the auxiliary carriage 65 occupies its forward position relative to the main carriage, and lifters 73 are lowered (see FIGS. 1 and 9).

Drive shaft 49 is then driven in counterclockwise direction as viewed in FIGS. 1 and 9 to act via chains 61 to pull the main carriage 41 forward (to the left as viewed in FIGS. 1 and 9). It will be understood that any suitable drive may be provided for drive shaft 49, such as a reversible electric motor-speed reducer drive. It will be further understood that drive shaft 49 may be operated directly from the plating apparatus, being rotated in one direction on a lift operation of the plating apparatus and in the opposite direction on a lowering operation of the plating apparatus. The main carriage moves forward continuously without stopping from its retracted starting position of FIGS. 1 and 9 to the forward position in which it appears in FIG. 14 at the forward (left) end of the base. As the main carriage 41 moves forward, auxiliary carriage 65 moves forward along with it through clearance distance D1 until roller R1 on the auxiliary carriage comes into engagement with stop plate 167 of stop LS1 (see FIG. 10). This arrests the auxiliary carriage in a lift position in which lifter cradles 75 are directly under the top bar 9 of the rack R (the entering rack) on the pair of hooks 23 of the auxiliary conveyor at the rack transfer station. The auxiliary carriage then remains stationary for a lift interval while the main carriage continues its forward movement under the arrested auxiliary carriage. During this lift interval, cam assemblies 83, moving forward with the main carriage 41, effect vertical lift of lifters 73 by the action of cam follower rollers 79 riding up the forward ramps 81b of the cam assemblies (compare FIGS. 10 and 11). Cradles 75 at the upper ends of lifters 73 thereupon vertically raise the top bar 9 of the rack R out of the hooks 23 (see FIG. 11) to enable the rack to be transported forward.

Figures 11, 12:
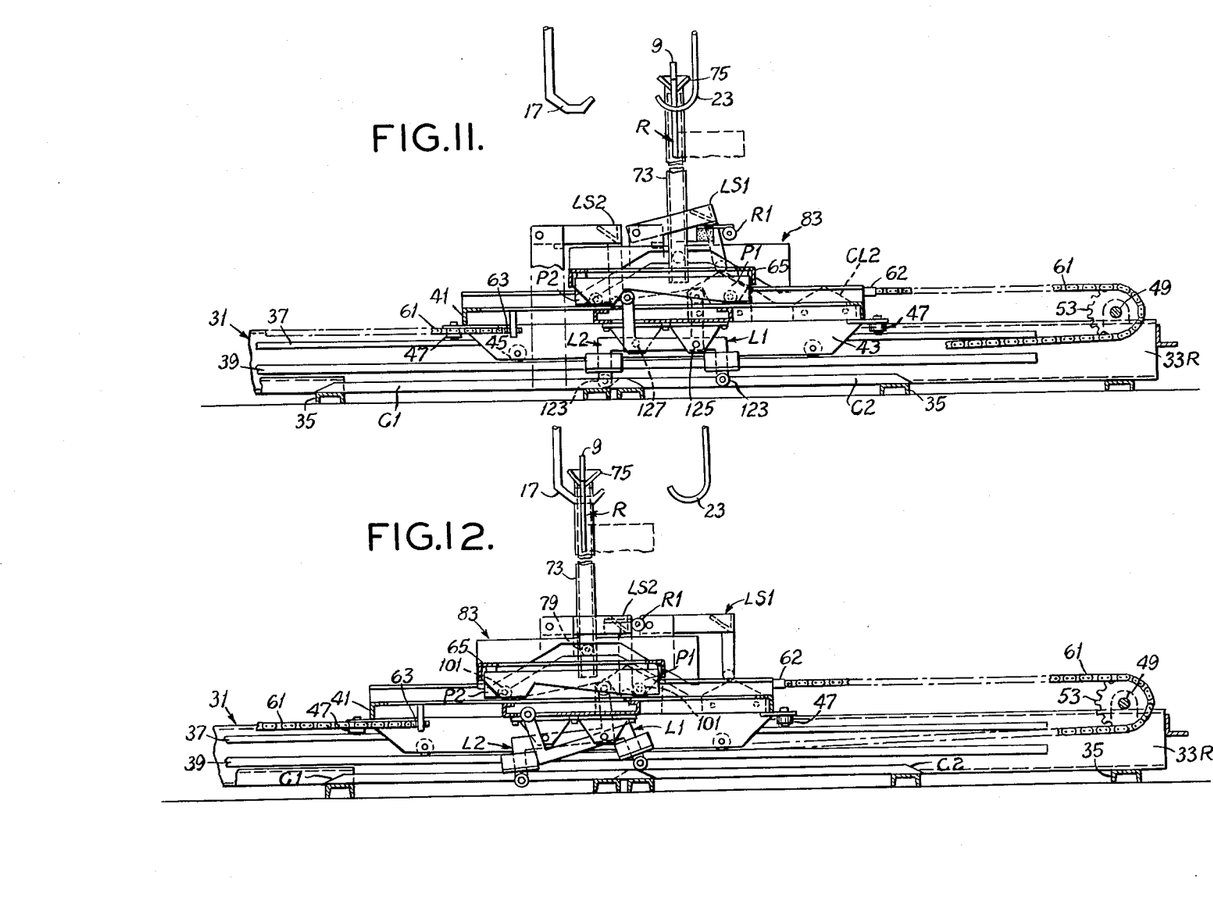

When the main carriage 41 has moved under the arrested auxiliary carriage to the point where the cam follower rollers 79 are substantially at the center of elevated positions 81a of cam tracks 81, roller 117 on latch lever L1, moving forward with the main carriage and moving upward as it rides along the gradual rise 97 of notch 95 in locking plate P1, engages against the steep leading end 99 of this notch (see FIG. 11). This locks the auxiliary carriage 65 and main carriage together. Also, at this point, cam CL1 on the main carriage has come into engagement with cam follower roller 173 of stop LS1, and swung this stop upward clear of roller R1 to permit the auxiliary carriage to move forward (see FIG. 11). Accordingly, the auxiliary carriage 65 then moves forward with the main carriage 41, lifters 73 being raised since the auxiliary carriage now occupies a centered position relative to the main carriage. This conjoint locked-together movement of the carriages with the lifters 73 raised continues to the point where the top bar 9 of the rack R carried by cradles 75 at the upper ends of lifters 73 is brought over to position above the pair of hooks 17 of the plating apparatus at the work transfer station (see FIG. 12).

At this point, roller R1 on the auxiliary carriage 65 comes into engagement with the stop plate 167 of stop LS2 (see FIG. 12). This arrests the auxiliary carriage in a lowering position in which lifters 73 register with the empty pair of plating apparatus hooks 17 at the work transfer station. The auxiliary carriage then remains stationary for a lowering interval while the main carriage 41 continues its forward movement under the arrested auxiliary carriage. During this lowering interval, cam assemblies 83, moving forward with the main carriage, effect vertical lowering of lifters 73 by the action of cam follower rollers 79 riding down the rearward ramps 81b (the right-hand ramps as viewed in FIGS. 12 and 13) of the cam assemblies. The top bar 9 of the rack R is thereby vertically lowered into the hooks 17 (see FIG. 13).

As the main carriage 41 approaches the FIG. 12 position, cam follower roller 123 on latch lever L1 rides up on cam rail C1, and roller 117 on latch lever L1 is withdrawn from the notch 95 in lock plate P1 (see FIG. 12). Then, when the main carriage 41 has moved forward under the arrested auxiliary carriage to the point where the cam follower rollers 79 are at the rearward (lower) ends of the rearward (right-hand) ramps 81b of the cam assemblies 83, as viewed in FIG. 13, cam CL2 on the main carriage has come into engagement with cam follower roller 173 of stop LS2, and swung this stop upward clear of roller R1 to permit the auxiliary carriage 65 to move forward (see FIG. 13 showing stop LS2 so swung upward). Then, the auxiliary carriage moves forward with the main carriage through clearance distance D2, lifters 73 being lowered, to the end of the forward stroke of the main carriage as shown in FIG. 14. Track R is left behind on the hooks 17 of the rack carrier 1 of the plating apparatus.

Following the completion of the forward stroke of the transfer apparatus (which brings the main carriage and the auxiliary carriage to the forward end of the base 31, and positions the auxiliary carriage at the rearward end of the main carriage, as appears in FIG. 14), the plating apparatus operates to index the pair of hooks 17 which have just received a rack forward from the work transfer station and to index another pair of hooks 17 carrying a rack with completed work thereon up to the work transfer station. The auxiliary conveyor remains in its previous position so that the just-emptied pair of hooks 23 of the auxiliary conveyor are still at the work transfer station. Then, drive shaft 49 is driven in clockwise direction to act via chains 61 to pull the main carriage back to its FIG. 9 starting position.

On return of the main carriage 41, all the above described operations occur in reverse under control of latch L2, cam rail C2, roller R2, stops RS1 and RS2, and cams CR1 and CR2. Thus, on return of the main carriage from its FIG. 14 back to its FIG. 9 position, auxiliary carriage 65 moves rearward along with it through clearance distance D2 to the FIG. 13 position, and is then arrested by engagement of roller R2 with stop RS1. The auxiliary carriage then remains stationary for a lift interval while the main carriage continues to move rearward, and cam assemblies 83 effect vertical lift of lifters 73 to raise the top bar 9 of the rack out of hooks 17 (in reverse of FIG. 12). When the main carriage 41 has reached the FIG. 12 position, roller 117 on latch lever L2 locks the auxiliary carriage and main carriage together. Also, at this point, cam CR1 swings stop RS1 upward clear of roller R2. Then auxiliary carriage 65 moves rearward with the main carriage to the FIG. 11 position, where it is arrested by engagement of roller R2 with stop RS2. The auxiliary carriage then remains stationary for a lowering interval while the main carriage continues its rearward movement, and cam assemblies 83 effect vertical lowering of lifters 73 to lower the top bar 9 of the rack R into the hooks 23 (in reverse of FIG. 10). As the main carriage approaches the FIG. 11 position, cam follower roller 123 on latch lever L2 rides up on cam rail C2, and roller 117 on lever L2 is withdrawn from the notch 95 in lock plate P2. Then, when the main carriage reaches the FIG. 11 position, cam CR2 raises the stop RS2 to permit the auxiliary carriage to move forward. Finally, the auxiliary carriage moves rearward with the main carriage 41 through clearance distance D1 back to the FIG. 9 starting position.

Clearance distances D1 and D2 are provided to enable movement of hooks 17 and 23 with racks thereon holding work past lifters 73 when at the ends of their horizontal stroke.

Figure 10:
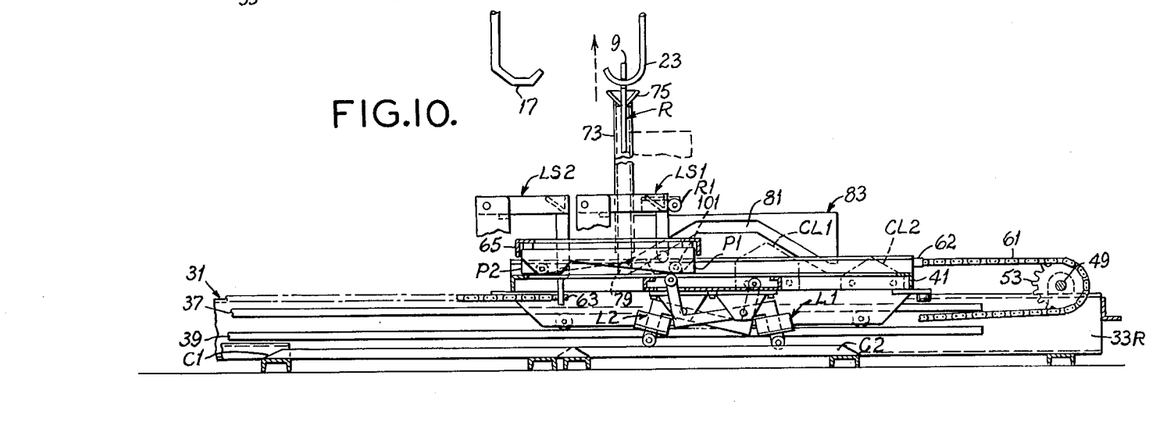
FIGS. 10–14 are views similar to FIG. 9 showing moved positions of parts.

From the above, it will be seen that the lowered lift means 73, 75 moves horizontally with the carriage 41 from the FIG. 9 end position to the FIG. 10 intermediate position. Then, at this intermediate position, vertical lift of the lift means is effected without horizontal movement of the lift means. Then, the raised lift means moves horizontally with carriage 41 to the FIG. 12 intermediate position. Here, vertical lowering of the lift means is effected without horizontal movement of the lift means. Then, the lowered lift means moves horizontally with carriage 41 to the FIG. 14 end position. On return of carriage 41 to the first end position (FIG. 9), the reverse action occurs. It will be observed that when the carriage 41 moves from the FIG. 9 to the FIG. 14 position, stops RS2 and RS1 are simply cammed up and out of the way of roller R2 by engagement of roller R2 with the inclined plates 169 of these stops. Similarly, when carriage 41 moves from the FIG. 14 back to the FIG. 9 position, stops LS2 and LS1 are simply cammed up and out of the way of roller R1 by engagement of roller R1 with the inclined plates of these stops.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. Transfer apparatus for lifting work from a first work support and transferring the work and lowering it onto a second work support, comprising a main carriage movable horizontally from a first end position to a second end position and back to the first end position, an auxiliary carriage movable with the main carriage and shiftable longitudinally relative to the main carriage, vertically slidable lifters at opposite sides of the auxiliary carriage, said lifters when raised being adapted to lift work from the first work support, and on longitudinal movement with the auxiliary carriage being adapted to move the work to a position for being lowered onto the second work support, and when lowered being adapted to lower the work onto the second work support, cam followers at the lower ends of said lifters, cams on the main carriage operable on said followers for raising and lowering said lifters in response to relative longitudinal shift of the auxiliary and main carriages, and means for intermittently arresting the auxiliary carriage at each of two intermediate positions on movement of the main carriage from its first to its second end position and also on movement of the main carriage back to its first end position to cause relative longitudinal shift of the auxiliary and main carriages to raise and lower the lifters.

2. Transfer apparatus as set forth in claim 1 further comprising means for locking the carriages together during their movement between said intermediate positions.

3. Transfer apparatus as set forth in claim 2 wherein said arresting means comprises two stops engageable by the auxiliary carriage one after the other on movement of the auxiliary carriage with the main carriage as the latter moves from its first to its second end position, and two stops engageable by the auxiliary carriage one after the other on movement of the auxiliary carriage with the main carriage as the latter moves back from its second to its first end position, and cam means on said main carriage for releasing said stops.

4. Transfer apparatus as set forth in claim 3 wherein said locking means comprises a first latch on said main carriage cooperable with a first lock member on said auxiliary carriage on movement of said main carriage from its first to its second end position, and a second latch on said main carriage cooperable with a second lock member on said auxiliary carriage on movement of said main carriage from its second back to its first end position, and fixed cams for controlling release of said latches.

5. Transfer apparatus for moving work from a first work support to a second work support comprising a main carriage continuously movable horizontally from a first end position to a second end position through first and second intermediate positions, lift means associated with the carriage, means for locking the lift means to the carriage first for horizontal movement with it from the first end position to the first intermediate position, then between the intermediate positions, and then between the second intermediate position and the second end position, means for arresting horizontal movement of the lift means relative to the carriage at the first and second intermediate positions, and means for effecting vertical lifting of the work by the lift means at the first intermediate position and vertical lowering of the work by the lift means at the second intermediate position while horizontal movement of the lift means is arrested at said intermediate positions.

6. Transfer apparatus as set forth in claim 5 further including an auxiliary carriage movable with the main carriage and shiftable longitudinally relative to the main carriage, said lift means being carried by said auxiliary carriage.

7. Transfer apparatus as set forth in claim 6 wherein the means for vertically lifting and lowering of the work comprises a cam on the main carriage and a cam follower associated with the lift means, the cam being operable on the cam follower for effecting the vertical lifting and lowering of the work at the first and second intermediate positions.

8. Transfer apparatus for lifting work from a first work support and transferring the work and lowering it onto a second work support, comprising a carriage movable substantially continuously in a generally horizontal path from a first end position to a second end position, said carriage passing through first and second intermediate positions corresponding to the locations of said first and second work supports in the course of its movement from its said first to its said second end position; and movable substantially continuously back from said first to said second end position and passing through said second and first intermediate positions in the course of this return movement, lift means associated with said carriage adapted for horizontal movement with the carriage, adapted to be held against horizontal movement at each of said intermediate positions while the carriage continues to move, and adapted for vertical raising and lowering movement while held against horizontal movement at said intermediate positions, and means for effecting movement of the lift means with the carriage through a clearance distance as the carriage moves from its first end position to said first intermediate position, then holding said lift means against horizontal movement and effecting raising of the lift means while the carriage continues to move, then, after the lift means has been raised, effecting horizontal movement of the raised lift means with the carriage from said first intermediate position to said second intermediate position, then holding said lift means against horizontal movement and effecting lowering of said lift means while the carriage continues to move, then, after said lift means has been lowered, effecting horizontal movement of said lift means with the carriage through a clearance distance as the carriage moves to its second end position, and on return of the carriage from its second end position to its first end position effecting movement of the lift means with the carriage through a clearance distance as the carriage moves from its second end position to said second intermediate position, then holding said lift means against horizontal movement, and effecting raising of the lift means while the carriage continues to move, then, after the lift means has been raised, effecting horizontal movement of the raised lift means with the carriage from said second intermediate position to said first intermediate position, then holding said lift means against horizontal movement and effecting lowering of said lift means while the carriage continues to move, then, after said lift means has been lowered, effecting horizontal movement of said lift means with the carriage through a clearance distance as the carriage moves to its first end position.

9. Transfer apparatus for lifting work from a first work support and transferring the work and lowering it onto a second work support, comprising a main carriage movable horizontally from a first end position to a second end position and back to the first end position, an auxiliary carriage movable with the main carriage and shiftable longitudinally relative to the main carriage, lift means carried by the auxiliary carriage and vertically movable relative thereto, said lift means when raised being adapted to lift work from the first work support, and on longitudinal movement with the auxiliary carriage being adapted to move the work to a position for being lowered onto the second work support, and when lowered being adapted to lower the work onto the second work support, and cam means associated with said main carriage and lift means for raising and lowering said lift means in response to relative shift of the auxiliary and main carriages, the auxiliary carriage being movable with the main carriage as the latter moves away from said first end position, means for arresting the auxiliary carriage and holding it stationary for a lift interval at a first intermediate position while the main carriage continues its movement, said cam means then raising the lift means in response to the resultant longitudinal shift of the auxiliary carriage relative to the main carriage, means for releasing the auxiliary carriage and locking it to the main carriage for movement with the latter from said first intermediate position to a second intermediate position, and means for releasing said locking means and arresting the auxiliary carriage at said second intermediate position and holding it stationary for a lowering interval while the main carriage continues its movement, said cam means then lowering the lift means in response to the resultant longitudinal shift of the auxiliary carriage relative to the main carriage.

10. Transfer apparatus as set forth in claim 9 further comprising means for releasing the auxiliary carriage from said second intermediate position to allow it to move with said main carriage and with said lift means lowered to said second end position.

References Cited by the Examiner

UNITED STATES PATENTS

| | | | |
|---|---|---|---|
| 1,930,608 | 10/33 | Manken | 214—1 |
| 2,653,502 | 9/53 | Meyer | 214—1 XR |
| 2,750,897 | 6/56 | Davis | 214—89 XR |
| 2,989,006 | 6/61 | Borodin | 198—20 XR |
| 3,091,347 | 5/63 | Sehn | 214—1 |

HUGO O. SCHULZ, *Primary Examiner.*

ERNEST A. FALLER, *Examiner.*